April 25, 1967 W. A. SPECK 3,315,556
FASTENING MEANS AND ENCLOSURE STRUCTURE
Filed April 23, 1965
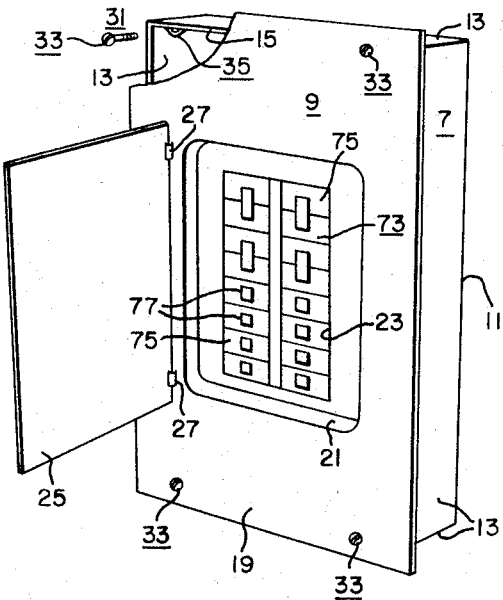
FIG. 1.
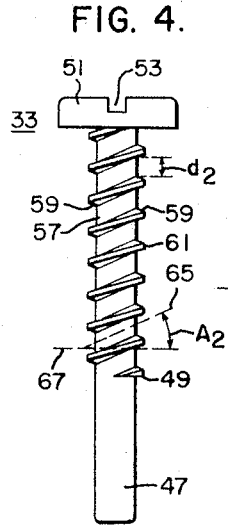
FIG. 4.
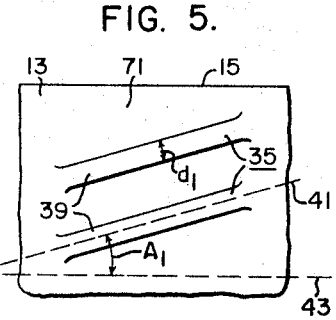
FIG. 5.
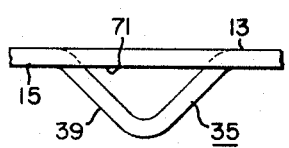
FIG. 6.
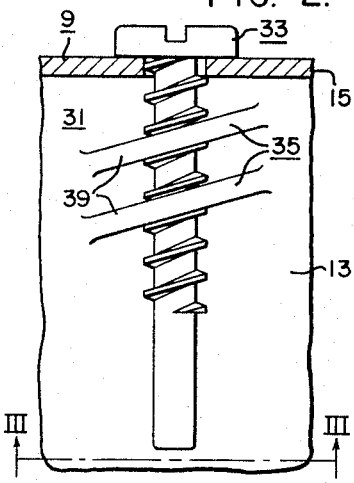
FIG. 2.
FIG. 3.
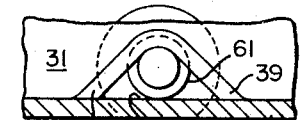
WITNESSES:
John L. Chopp
James F. Young
INVENTOR
Willis A. Speck
BY
William A. Elchik
ATTORNEY

United States Patent Office 3,315,556
Patented Apr. 25, 1967

3,315,556
FASTENING MEANS AND ENCLOSURE STRUCTURE
Willis A. Speck, Trumbull, Conn., assignor to Westinghouse Electric Corporation, Pittsburgh, Pa., a corporation of Pennsylvania
Filed Apr. 23, 1965, Ser. No. 450,303
2 Claims. (Cl. 85—32)

This invention relates generally to fastening means and more particularly to enclosures of the type comprising a receptacle and a cover structure that is removably connected to the receptacle with screw-type fastening means.

It is old in the fastening art to provide fastening means comprising a screw and a lanced sheet-metal structure that is tapped or threaded to cooperate with the screw. In the use of these structures, a tapping operation is required. This tapping operation is expensive not only because it is an additional operation in the manufacture of a product; but also because the shape of the lanced sheet-metal member does not lend itself to ready tapping and the taps frequently get caught and break. Thus, for certain installations self-tapping or self-threading screws have been used to cooperate with a lanced sheet-metal structure. While the tapping operation is eliminated in these cases, the torque required to drive the screw that is cutting or forming its own thread is relatively high so that it is difficult for a worker who is working in the field without available power tools to use this type of fastening means.

Accordingly, an object of this invention is to provide an improved fastening means comprising a screw and a lanced sheet material member wherein the screw and the lanced member are constructed to provide a fastening combination that does not require either a tapping operation of the lanced member or a self-tapping operation by means of a self-tapping screw.

A more general object of this invention is to provide an improved screw-and-band type fastening means.

A further object of this invention is to provide an enclosure comprising a receptacle part and a separate cover structure with improved fastening means for drawing the cover structure toward the receptacle part to a secured position.

The invention, both as to structure and operation, together with additional objects and advantages thereof, will be best understood from the following detailed description when read in conjunction with the accompanying drawing.

In said drawing:

FIGURE 1 is a perspective view, with parts broken away, of an enclosure embodying principles of this invention;

FIGURE 2 is a partial sectional view illustrating one of the fastening combinations used in the enclosure seen in FIGURE 1;

FIGURE 3 is a sectional view, with parts broken away, taken generally along the line III—III of FIG. 2;

FIGURE 4 is an elevational view of the screw member seen in FIGS. 1–3;

FIGURE 5 is an elevational view of part of the lanced side wall seen in FIGS. 1, 2 and 3; and FIGURE 6 is a top plan view of the part of the lanced side wall seen in FIG. 5.

Referring to the drawings, there is shown in FIGURE 1 an enclosure 5 comprising a receptacle part 7 and a cover structure 9. The receptacle part 7 is an open-box type receptacle formed of sheet metal and comprising a generally planar base 11 with four generally planar side walls 13 extending perpendicularly from the base 11 to form an open front. The side walls terminate at an end part 15 that surrounds and forms the opening. The end part 15 is disposed along a plane that is parallel to the plane of the base 11.

The cover structure 9 comprises a sheet metal generally planar cover part 19 having a depressed part 21 formed therein and a generally rectangular opening 23 in the part 21. The cover structure 9 also comprises an openable cover 25 that is pivotally supported on the part 19 by means of hinges 27. The cover 25 in the closed position thereof covers the opening 23.

The cover structure 9 is secured to the receptacle part 7 by means of four fastening means 31 (FIGURES 2 and 3) disposed at the four corners of the receptacle opening. Each of the four fastening means 31 comprises a screw member 33 and band means 35. One of the fastening means 31 is disclosed in FIGURE 1 with the screw member 33 being shown in exploded perspective. The screw members 33 of the other three fastening means 31 appear also in FIGURE 1. It is to be understood that each of the four fastening means 31 is identical to the fastening means 31 that is herein specifically disclosed and described.

The band means 35 (FIGURES 2–3, 5 and 6) comprises 2 bands or more specifically lances 39 that are formed in the side wall 13 by means of a stamping operation. Each of the bands 39 is formed with a particular widthwise dimension $d_1$ (FIG. 5). Each of the bands 39 is also formed such that an imaginary mean line 41 extending lengthwise through the band is disposed at an angle $A_1$ relative to an imaginary plane 43 that is parallel to the generally planar end part 15 of the receptacle part 7. The bands 39 are formed with the dimension $d_1$ and with the slant as indicated by the angle $A_1$ in order to cooperate with the screw member 33 in a manner to be hereinafter more specifically described.

The screw 3 (FIG. 4) comprises a threaded shank part 47 comprising a helical thread part 49. The screw 33 is also provided with a head part 51 having a slot 53 therein for receiving a screwdriver or other suitable tool. The root 57, which comprises the bottom flat helical surface between adjacent or opposite flanks 59 of the thread 49, is formed with a widthwise dimension $d_2$. The thread flanks 59 connect the root 57 with the thread crest 61. The thread part 49 is formed to cooperate with the bands 39 (FIG. 5). Referring to FIG. 4, the screw 33 is formed such that an angle $A_2$, which may be termed the lead angle or screw angle, is equal to the angle $A_1$ of the bands or lances 39. The angle $A_2$ may be described as the angle that is projected on a plane that is parallel to a vertical plane that passes through the axis of the screw (for example, the plane of the paper as seen in FIG. 4) which angle is formed by the direction or slant 65 of the helix of the thread and a plane 67 that is normal to the axis of the screw. The angle $A_2$ may also be described as the angle that appears in side elevation of the screw member and that is formed between the plane 67 that is normal to the axis of the screw member and the mean line 65 of the root 57 or the mean line (also 65) between the adjacent crests 61.

The fastening means 31 is so constructed that the bands or lances 39 serve as what is known as a female portion to cooperate with the male screw member 33. When it is desired to mount the cover structure 9 on the receptacle part 7 (FIG. 1) the cover structure is positioned adjacent the edge 15 of the receptacle part 7. The four screws 33 are then passed into suitable openings in the cover structure 9 and screwed into the four band or lance structures 35 to draw the cover structure 9 against the edge 15 to thereby secure the cover structure 9 to the receptacle 7. The screw 33 and lance structure 35 are constructed with the dimension $d_2$ substantially equal to the dimension $d_1$ to provide that the bands 39 will fit between the flanks 59 of the thread 49 at the root 57 of the screw structure 49 with a snug fit, and the angles $A_1$ and $A_2$ are equal whereby the screw 33 will cooperate with the band means 35 to provide axial movement of the screw 33 upon rotation of the screw. As can be seen in FIG. 2, the adjacent bands 39 are spaced a dimension great enough to provide an empty convolution (FIG. 2) of the threaded shank between the adjacent bands 39. As can be seen in FIG. 3, the crest 61 of the thread 49 engages the inner flat surface 71 of the generally planar side wall 13 and the bands or lances 39 fit against the root of the thread so that the screw is captured firmly between the side wall 71 and the bands or lances 39. The crest 61 may cut slightly into the surface 71 to form shallow slanted grooves or female thread portions when the screw is worked to move in a vertical (FIG. 2) direction. This cutting action, however, is not necessary for an adequate fastening operation and it varies depending upon the characteristics of the materials and the sharpness of the thread crest 61.

As can be seen in FIG. 1, the cover structure 9 is drawn toward the receptacle 7 into engagement with the end part 15 by means of the four screws 33 that cooperate with four separate lance means 35 in the same manner specifically described with reference to FIGS. 2–6.

The illustrated (FIG. 1) enclosure 5 is a load-center enclosure having a plurality of molded-case type circuit breakers 73 mounted therein. Each of the circuit breakers 73 comprises an insulating housing 75 and a handle 77 extending from the housing 75 to operate a pair of contacts (not shown) that are disposed within the housing 75. The circuit breakers 75 may be of the type disclosed in the patent to L. W. Dyer, Patent No. 2,677,025, issued Apr. 27, 1954 and assigned to the assignee of the instant case. The circuit breakers 75 are mounted in the receptacle part 7 in a well known manner, and the cover structure 9 is placed down to engage the front portions of the housings 75. The handles 77 protrude through the opening 23 and they are accessible for operation when the cover 25 is in the open (FIG. 1) position.

From the foregoing, it can be understood that there is provided by this invention an improved fastening means comprising a sheet material member and a screw member, which members are constructed and arranged to cooperate with each other in the manner disclosed. The sheet material or sheet metal member is provided with band means comprising two lances formed in the member by means of a stamping operation. The screw and lanced member are so constructed that they provide a fastening combination that does not require either a tapping operation of the lanced member or a self-tapping operation by operation of a self-tapping screw. There is also provided an improved enclosure combination comprising a receptacle and a separate cover structure secured to the receptacle by means of the improved securing means. In this improved combination the receptacle side walls are formed with lances therein to cooperate with the screws in order to provide the improved fastening combination. The invention has particular utility in enclosure combinations for load centers wherein the receptacle part of the combination is constructed to fit within a close-fitting opening in a wall-space and wherein a separate cover-structure is moved into a mounted position flush with the wall surface. At these installations, the cover structure does not necessarily engage the outer edge or outer end part of the receptacle and the screws are tightened only to the extent that the cover structure firmly engages the outer wall surface. The fastening means of this invention is disposed entirely within the confines of the front-elevational-view dimensions of the receptacle part of the enclosure. Thus, the external surfaces of the four side walls of the receptacle part can fit snugly within an opening in a wall that will engage the four side walls to provide a close fitting installation.

While the invention has been disclosed in accordance with the provisions of the patent statutes, it is to be understood that various changes in the structural details thereof may be made without departing from the spirit and scope of the invention.

I claim as my invention:

1. A fastening means comprising a sheet-metal member having a flat planar main surface and a plurality of slanted parallel elongated lance members protruding from said flat planar main surface, said sheet-metal member comprising a generally planar end surface, said lance members being slanted relative to said generally planar end surface such that a mean line lengthwise through each of said lance members will form an angle with the plane of said generally planar end surface which angles are substantially equal in dimension, a screw member comprising a threaded shank having a lead angle susbtantially equal to each of said angles of said lance members, said threaded shank and said sheet-metal member being constructed such that each of said lance members fits between opposite flanks of said threaded shank with adjacent lance members being spaced such that between each set of adjacent lance members there is at least one convolution of said threaded shank that does not receive a lance member and with the crest of said threaded shank engaging said flat planar main surface and with said threaded shank being captured between said lance members and said flat planar main surface such that upon rotation of said screw member said screw member will be moved axially in a direction generally normal to the plane of said generally planar end surface.

2. An enclosure comprising a receptacle part and a cover structure, said receptacle part comprising a sheet-metal member comprising a generally planar base and generally planar side wall means extending from said base in a direction generally normal to the plane of said base to form an open front, said cover structure comprising a generally planar sheet-metal member, fastening means fastening said cover structure to said receptacle part at said open front, said fastening means comprising a plurality of elongated lance members formed in said side wall means and protruding from an inside planar surface of said side wall means, each of said lance members comprising a member having a widthwise dimension and being positioned such that a mean line drawn lengthwise through each of said lance members will be at a predetermined angle relative to a plane parallel to the plane of said base, the mean lines of said plurality of lance members being parallel, said fastening means comprising a screw member having a threaded shank, the dimension between the opposite flanks of said threaded shank being such that said lance members fit within the opposite flanks of said threaded shank, adjacent lance members being spaced at least a dimension great enough to provide an empty convolution of said threaded shank between adjacent lance members which empty convolution does not receive a lance member, the lead angle of said threaded shank being substantially the same as said angles of said lance members said side wall means with said lance members therein and said screw member being constructed and arranged such that when said screw member is passed through an opening in said cover structure and moved into an attaching position each of said lance members is disposed between opposite flanks of said threaded member with the crest of said threaded member engaging said inside planar surface of said side wall means and with the opposite side parts of each of said lance members substantially engaging opposite flanks of said threaded member whereby upon rotation of said screw member into said attaching position said screw member is moved axially in a direction generally normal to the plane of said base to thereby draw said cover structure toward said receptacle part to the attached position.

(References on following page)

References Cited by the Examiner

UNITED STATES PATENTS

| | | |
|---|---|---|
| 454,959 | 6/1891 | Walker. |
| 2,130,243 | 9/1938 | Mitchell. |
| 2,594,027 | 4/1952 | Jakeway. |
| 2,818,764 | 1/1958 | Switzer. |
| 2,917,966 | 12/1959 | Kahn. |
| 3,042,354 | 7/1962 | Goodwin _____ 85—32 |

CARL W. TOMLIN, *Primary Examiner.*

MARION PARSONS, Jr., *Examiner.*